(12) United States Patent
Kakinami

(10) Patent No.: US 6,813,371 B2
(45) Date of Patent: Nov. 2, 2004

(54) ON-VEHICLE CAMERA CALIBRATION DEVICE

(75) Inventor: Toshiaki Kakinami, Aichi-ken (JP)

(73) Assignee: Aisin Seiki Kabushiki Kaisha, Aichi-ken (JP)

( * ) Notice: Subject to any disclaimer, the term of this patent is extended or adjusted under 35 U.S.C. 154(b) by 566 days.

(21) Appl. No.: 09/745,807

(22) Filed: Dec. 26, 2000

(65) Prior Publication Data

US 2001/0006554 A1 Jul. 5, 2001

(30) Foreign Application Priority Data

Dec. 24, 1999 (JP) .......................................... H11-365754

(51) Int. Cl.$^7$ ................................................ G06K 9/00
(52) U.S. Cl. ........................ 382/104; 340/333; 348/149; 701/117
(58) Field of Search ................................ 382/100, 103, 382/104, 106, 107, 152, 199; 340/901, 902, 903, 904, 907, 438, 439, 938, 939, 988; 701/23, 28, 29, 36, 40, 41, 44, 70, 93, 96, 98, 116, 117, 225; 348/113, 149

(56) References Cited

U.S. PATENT DOCUMENTS

| | | | | |
|---|---|---|---|---|
| 4,926,346 A | * | 5/1990 | Yokoyama ................... | 701/28 |
| 5,166,681 A | * | 11/1992 | Bottesch et al. ............ | 340/933 |
| 6,049,619 A | * | 4/2000 | Anandan et al. ............ | 382/107 |
| 6,181,992 B1 | * | 1/2001 | Gurne et al. ................. | 701/29 |
| 6,185,489 B1 | * | 2/2001 | Strickler ..................... | 701/29 |
| 6,198,996 B1 | * | 3/2001 | Berstis ........................ | 701/36 |
| 6,269,175 B1 | * | 7/2001 | Hanna et al. ............... | 382/107 |
| 6,362,848 B1 | * | 3/2002 | Lohscheller et al. ........ | 348/149 |

FOREIGN PATENT DOCUMENTS

JP    H4-10344    1/1992

OTHER PUBLICATIONS

"INRIA– Camera Calibration without Feature Extraction Research Report", by Luc Robert, No. 2204, Feb. 1994, pp. 1–22.
"Lens Distortion Calibration Using Point Correspondences", by Gideon P. Stein, No. 1595, Nov. 1996, pp. 1–4.

* cited by examiner

*Primary Examiner*—Bhavesh M. Mehta
*Assistant Examiner*—Abolfazl Tabatabai
(74) *Attorney, Agent, or Firm*—Sughrue Mion, PLLC

(57) ABSTRACT

An on-vehicle camera calibration device is provided and a method of calibrating an on-vehicle camera easily is carried out by using a calibration indicator other than a three dimensional one. The calibration indicator makes it possible to set camera parameters to form an image on an arbitrary portion of a screen. The calibration indicator is in the form of a planar calibration indicator TB. A camera picked-up image including the calibration indicator TB is displayed on a screen on which a window is also displayed in superposed fashion. The position of the window is changed in a 2D image coordinate system. The position of the window is adjusted by manipulating an adjust button 7 so that the calibration indicator TB falls within the window. When the calibration indicator TB is placed in the window in coincident fashion, the resultant camera parameters (unknown roll $\theta$ r, tilt angle $\theta$ t, and pan angle $\theta$ p) are set as camera parameters of the camera 17.

9 Claims, 7 Drawing Sheets

(WDr: rotation)

(WDt: shift in y-direction)

(WDp: shift in x-direction)

Fig. 7

| mode transition A-button | ① 0.5 sec-press: roll angle adjust mode<br>② 0.5 sec-press: tilt angle adjust mode<br>③ 0.5 sec-press: pan angle adjust mode<br>④ 0.5 sec-press: record-adjust mode termination mode *1) |
|---|---|
| window movement B-button | ① 0.5 degree clockwise rotation of window whenever being pressed<br>② 0.5 degree shift-down of window whenever being pressed<br>③ 0.5 degree shift-left of window whenever being pressed |
| window movement C-button | ① 0.5 degree counterclockwise rotation of window whenever being pressed<br>② 0.5 degree shift-up of window whenever being pressed<br>③ 0.5 degree shift-right of window whenever being pressed |

*1) store the adjusted camera parameters in E2-ROM and terminate adjust mode
Upon termination of the adjust mode, on the basis of the adjusted camera parameters, a forecasted vehicle travel path is displayed.

ON-VEHICLE CAMERA CALIBRATION DEVICE

BACKGROUND OF THE INVENTION

1. Field of the Invention

The present invention is directed to an on-vehicle camera calibration device which is operated for calibrating the camera when it is mounted on a vehicle and/or when the current position of the camera mounted on the vehicle offsets from the criteria position and the present invention is also directed to a method of such a calibration and a calibration indicator used in such a method.

2. Prior Art

With respect to calibrating a camera, various companies and research organizations have been conducting research for establishing algorithms. As an example of such algorithms, a method is provided. In this method, a distinguishable 3D object having a known shape is placed as a calibration indicator in 3D space and depending on how the features of the 3D object are displayed in an image picked up by the camera for calculating the camera parameters. For example, such a method is disclosed in a paper titled "INRIA Camera Calibration without Feature Extraction Research Report" No. 2204 (February 1994) pp. 1–21. In this disclosure, the camera parameters having a freedom degree of 11 are found by using the featured 3D calibration indicator.

Also, in Japanese Patent laid-open print No. Hei. 4-10344, an on-vehicle camera calibration device is disclosed. This device includes a camera which picks up a vehicular rear-view scene and a signal generator which generates an on-screen distance scale and/or characters. This device operates such that the distance scale is moved in the vertical direction at will within an on-screen image of the vehicular rear-view scene for placing the distance scale at a correct position on the screen.

In the former prior art, the camera parameters are determined from the 3D space in such a manner that the distinguishable 3D object having a known shape is placed at a position which can be picked up by the camera and an on-screen position of the 3D object in the camera image coordinate system is found on which the 3D object is placed. In this way, if the camera is calibrated after the camera is mounted on the vehicle, the calibration is made at the production or assembly line along which the vehicle is conveyed. In such a case, for doing the calibration successfully, the method of the calibration must be easy. On the shop-floor, if the calibration is made by using the characterized 3D object, it is not too efficient for the 3D object to be an indicator on the set point for each on-vehicle camera. In addition, placing the 3D object beneath the operator's feet is not desirable from the view point of accident prevention and therefore is to be avoided. Thus, the calibrating indicator is desired to be one, such as an on-floor painted mark, which can be walked on by the operator.

On the other hand, in the latter prior art, the distance scale is moved in the vertical direction at will within the on-screen image of the vehicular rear-view scene for placing the distance scale at a correct position on the screen. In this method, setting the camera parameters is not accomplished, so that displaying the forecasted vehicle travel path at an arbitrary portion on the screen cannot be attained when the forecasted vehicle travel path which assists the driver's steering operation during parking is desired to be displayed on the screen. Usual such a path is superposed on the image of the vehicular rear-view scene so as to be movable depending on the steering operation.

In view of the foregoing circumstances, the present invention provides (1) a camera calibration device and a method which make it possible to calibrate a camera even if the camera is mounted on a vehicle and (2) a calibrator indicator which makes it possible to set camera parameters for displaying an image on an arbitrary portion on the screen.

Thus, a need exists to provide, while maintaining the aforementioned advantage, a seat occupant sensor device in which the film is formed into a shape which increases in its the yield rate when punched from a resin sheet and which is capable of being equipped in various types of vehicular seats.

SUMMARY OF THE INVENTION

The present invention has been developed to satisfy the need noted above.

A first aspect of the present invention is to provide a camera calibration device for calibrating an on-vehicle camera based on an object placed in an image picked up by the on-vehicle camera, which comprises:

a planar calibration indicator as the object;

displaying means for displaying the image including the planer calibration indicator;

window displaying means for displaying an image on the displaying means;

adjusting means for adjusting a position of the window displaying means within a coordinate of the image picked up by the on-vehicle camera; and parameter setting means for setting camera parameters such that when the calibration indicator comes within the window as a result of an adjustment by the adjusting means the resultant camera parameters are employed as the camera parameters.

In accordance with the first aspect, in the calibration, a planar calibration indicator is used and the camera image including the planar calibration indicator is displayed on the displaying means on which the window is also displayed. Within the image coordinate of the camera image the position of the window is moved and the position relation is adjusted by the adjusting means so that the planar calibration indicator falls in the window. When such a condition is established, the resultant camera parameters are used as the camera's parameters to be set. This means that setting the camera's parameters can be made only by manipulating the adjusting means. In this case, due to the fact that the calibration indicator is in the form of a planar configuration, when the calibration is fixed or adhered on the floor, the calibration is not disturbed and even in the vehicle production line the camera calibration can be made in easy fashion.

A second aspect of the present invention is to provide a camera calibration method of calibrating an on-vehicle camera based on an object placed in an image picked up by the on-vehicle camera, which comprises the steps of: preparing a planar calibration indicator as the object, displaying means for displaying the image including the planer calibration indicator, window displaying means for displaying a window on the displaying means, and adjusting means for adjusting a position of the window displaying means within a coordinate of the image picked up by the on-vehicle camera;

displaying the planar calibration indicator on the displaying means;

adjusting a position relation of the window so as to include the planar calibration indicator therein; and setting camera parameters such that the resultant camera parameters occur when the planar calibration indicator is located in the window.

In accordance with the second aspect, in the calibration the planar calibration indicator is used and the camera image including the planar calibration indicator is displayed on the displaying means on which also the window is displayed. Within the image coordinate of the camera image the position of the window is moved and the position relation is adjusted by the adjusting means so that the planar calibration indicator falls in the window. When such a condition is established, the resultant camera parameters are used as camera's parameters to be set. This means that setting the camera's parameters can be made only by manipulating the adjusting means. In this case, due to the fact that the calibration indicator in the form of a planar configuration, when the calibration is fixed or adhered on the floor, the calibration is not disturbed and even in the vehicle production line the camera calibration can be made in easy fashion.

In this case, if an adjustment is made by manipulating the adjusting means such that the on-screen is rotated or shifted relative to the calibration indicator, setting the camera parameters is made possible in an easy way, which makes it possible to display an image on an arbitrary portion on the screen. On the other hand, if the movable image related to the vehicular travel path is displayed in superposed fashion on the on-vehicle displaying means on which the picked-up scene image is displayed and a part of the movable image is used as camera parameters, no calibration indication is required to be placed in the 3D space picked up by the camera.

Moreover, as the movable image, a forecast vehicle travel path which varies with the steering angle is employed, obtaining camera parameters is made possible from a portion of the forecasted vehicle travel path, which makes it possible to confirm whether or not such a setting of the camera parameters is correct in an instant. In this case, the forecast vehicle travel path is displayed in the form of a ladder for indicating a distance as a span of two adjacent bars.

The entire disclosure of Japanese Patent Application H11-365754, upon which a claim for priority is based, is incorporated herein by reference.

BRIEF DESCRIPTION OF THE DRAWINGS

The above and other objects, features and advantages of the present invention will be more apparent and more readily appreciated from the following detailed description of a preferred exemplary embodiment of the present invention, taken in connection with the accompanying drawings, in which;

FIG. 7 is a table showing how the window is moved in different transition modes.

DETAILED DESCRIPTION OF THE PRESENT INVENTION

Figure 1:
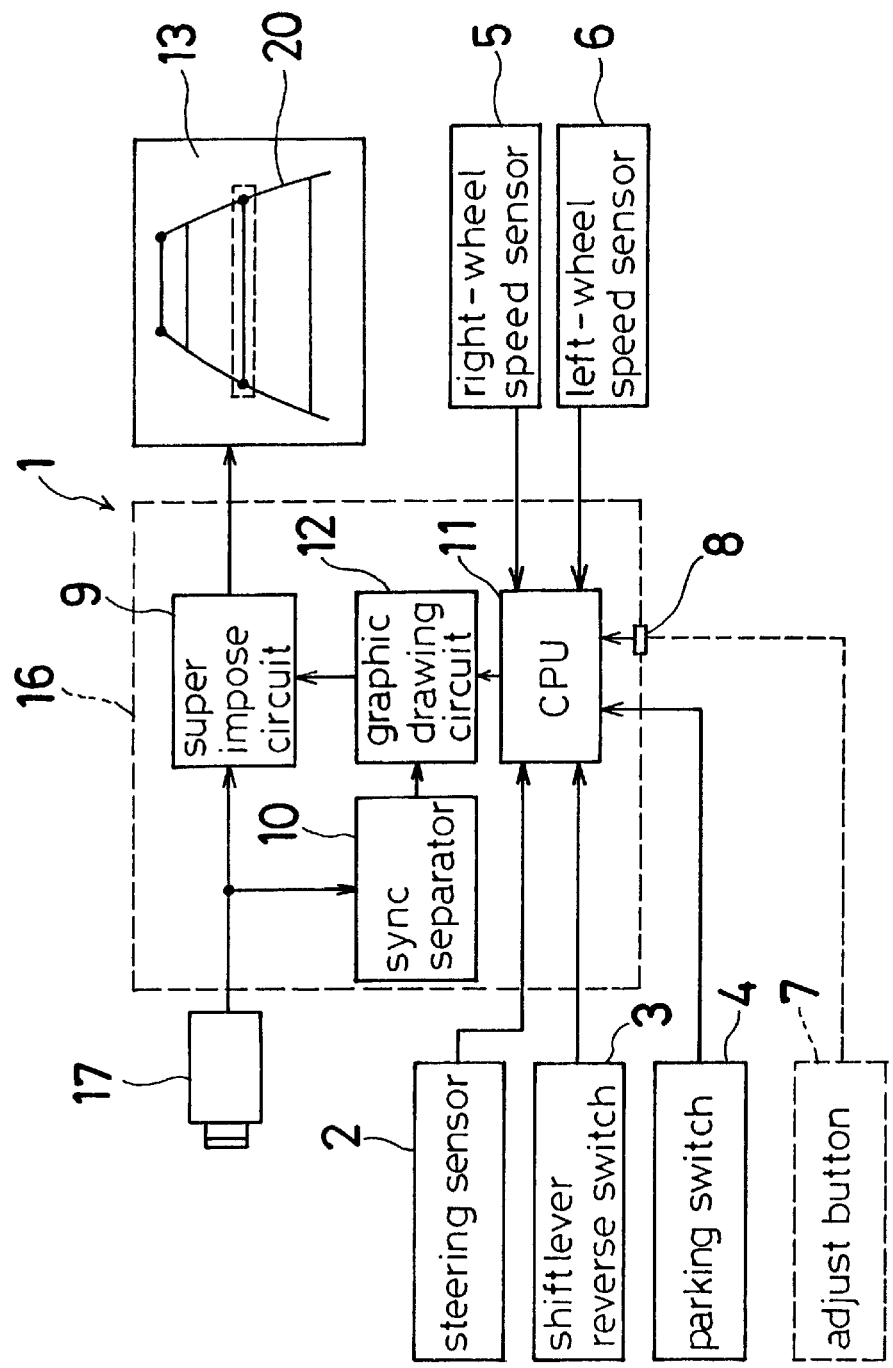
FIG. 1 illustrates a block diagram of a on-vehicle camera calibration device in accordance with the present invention when the device is applied to a parking assist device.

First of all, with reference to FIG. 1, there is illustrated a parking assist device to which is applied a preferred embodiment of a calibration device in accordance with the present invention. The parking assist device 1 is, as known, equipped on a vehicle for the assistance of parking the vehicle. In this parking assisting device 1, a forecast vehicle travel path 20 along which the vehicle travels backward is displayed on a display 13 and superposed on a vehicular rear-view scene. The parking assist device further comprises a controller 16 constructed to receive signals from various devices, a CCD camera 17 which takes a picture or image of the vehicular rear-view scene, a steering sensor 2 which detects a steering angle of a steering wheel 21, a shift lever reverse switch 3 which detects whether or not a shift lever of a transmission is in the reverse mode, a parking switch 4 which begins to operate the parking assist function when the vehicle is being parked, and wheel speed sensors 5 and 6 which detect the speeds of right and left driven wheels, respectively. On the basis of these signals, a CPU 16 displays the forecast vehicle travel path 20 and the vehicular rear-view scene image on the screen 13 in a superposed digital image fashion. The controller 16 includes additionally a connector 8 to be connected with an external device which makes it possible to establish an external calibration of a position of the CCD camera 17 when the vehicle is shipped from the factory or a current position is shifted or offset from a predetermined criteria position due to a collision or vehicle-travel vibrations. With an adjusting button 7 connected to the connector 8, if the adjusting button 7 is manipulated in such a manner that camera parameters which are previously set when the CCD camera 17 is at the criteria position are adjusted, calibrating the CCD camera 17 is made possible.

Inside the controller 16, there are provided a CPU 11 having an authority for controlling the system, a graphics drawing circuit 12 for plotting one or more graphs on a display 13, a superimpose circuit 9 for superimposing graphic signals on the rear-view image, a sync separator 10 which separates a synchronizing signal from the video signal for feeding the resultant signal to the graphics drawing circuit 12, and other elements.

Figure 2:
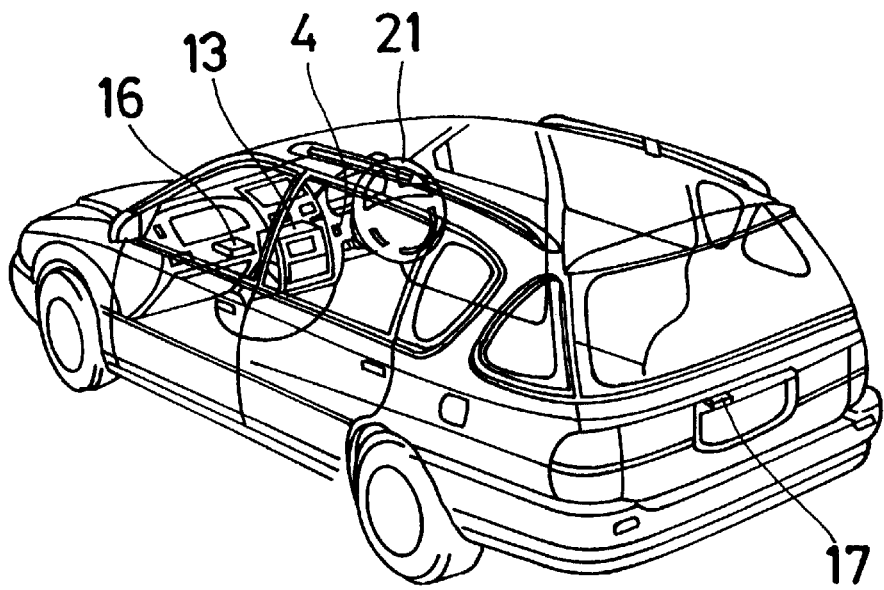
FIG. 2 illustrates a perspective view of the parking assist device when mounted on a vehicle.
Figure 3:
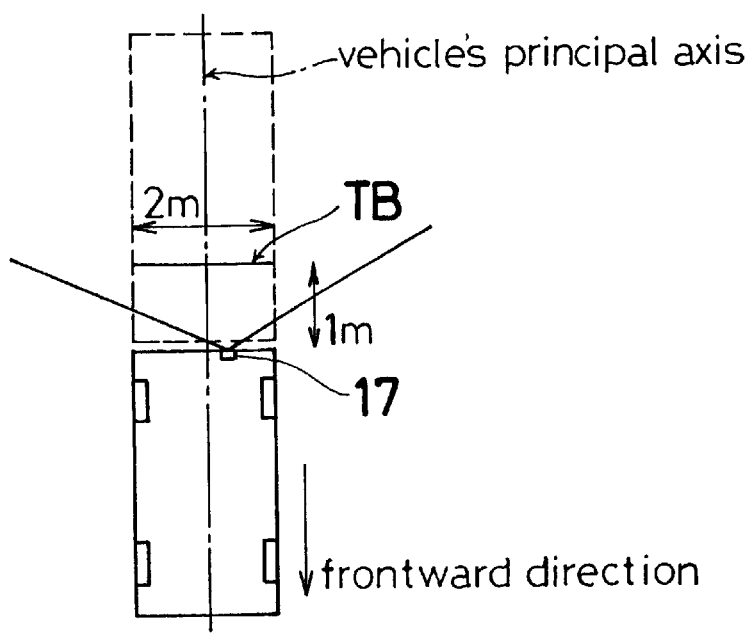
FIG. 3 illustrates a relationship between an on-vehicle camera and a target bar.
Figure 4:
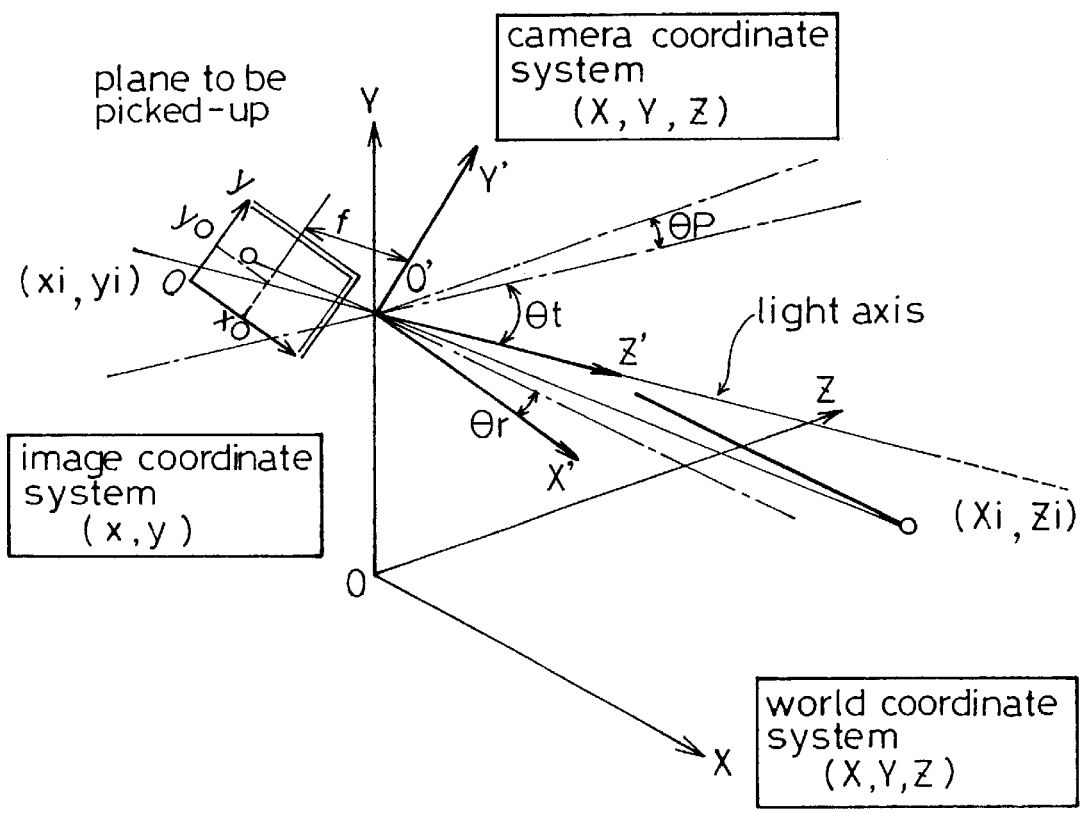
FIG. 4 illustrates an exemplary view of a transparent projection transformation when 3D coordinates (world coordinate system/camera coordinate system) are transformed into 2D coordinates.

Referring next to FIG. 2 which illustrates a vehicle on which is provided the parking assist device 1 according to the present invention, the CCD 17 camera which takes the vehicular rear-view scene is fixedly placed on a portion of the rear side of the vehicle in such a manner that the portion is slightly offset from an upper center of a tag or license plate which corresponds to a substantial center of the vehicular rear side, and an optical axis of the CCD camera 17 is oriented in the downward direction so as to make an angle of about 30 degrees relative to the ground. The CCD camera 17 per se has a wide angle lens with as wide a field of vision as wide as 113 degrees horizontally and is capable of picking-up a region which is up to about 8 meters away in the rearward direction.

Inside a vehicular passenger compartment, the display 13 is mounted in an angle mode on a panel surface of a center console for being watched by a driver. The controller 16 is placed in an upper portion of a glove box. In addition, the parking switch 4 which requests the parking assist function when the vehicle is operated to park is positioned, for the driver's easy access, near the center console.

If the parking switch 4 is turned on by the driver while the shift reverse switch 3 is in reverse mode (i.e., the driver has a plan to park the vehicle with the assistance of the parking assist function), the parking assist device 1 calculates a neutral point of the steering angle on the basis of information from each of the wheel speed sensors 5 and 6, determines the amount of the rotation angle of a steering wheel 21 in either direction from the neutral point as a criteria point on the basis of information from the steering sensor 2, and displays the forecast vehicle travel path 20 when the vehicle travels backward on the display 13 such that the forecast vehicle travel path 20 is superposed on the on-screen vehicular rear-view scene image. The forecast vehicle travel path 20 is in the form of a movable image. The forecast vehicle travel path 20 moves depending on the rotation direction and amount of rotation angle of the steering wheel 21. The forecast vehicle travel path 20 is represented as a ladder as shown in FIG. 1 wherein the span between vertical lines represents the vehicle's width and the horizontal lines represents distances of, for example, 0.5 m, 1 m, and 3 m measured from the vehicular rear side. Even if the driver is not good at parking the vehicle, he/she can succeed in parking the vehicle only by turning on the parking switch 4 due to the fact that the forecast vehicle travel path 20 which appears on the display 13 tells in a visual mode how the vehicle moves and the vehicular rearward environment scaled with distance. It is to be noted that the displaying method and the displaying mode of the forecast vehicle travel path 20, which can be established easily by geometric calculations, are discussed in detail in Japanese Patent laid-open print No. Hei. 11 (1999)-334470. Thus, additional explanation of the forecast vehicle travel path 20 is omitted.

As can be understood from the foregoing explanation that the forecast vehicle travel path 20, which is displaced during parking of the vehicle, serves to offer a sense of distance or a feeling of distance to the driver. In order to display the forecast vehicle travel path 20 on the display 13 with precision or accuracy, the CCD camera 17 has to be calibrated in view of its error when mounted.

Thus, calibrating the CCD camera 17 will be described hereinbelow. Calibrating the CCD camera 17 is made in a production line when the CCD camera 17 is mounted on the vehicle, or in a repair shop when the position of the CCD camera 17 is offset from the criteria position due to a vehicle collision or vibrations.

The following description is an example of calibrating the CCD camera 17 when in the production line. In the production line, calibrating the CCD camera 17 is made while the vehicle is being parked at a set or predetermined position. For such a parking, the vehicle is moved forward or rearward until its wheels are brought into preformed tire grooves. An adjusting target bar TB which is used as a calibration indicator when calibrating the CCD camera 17 is fixed or adhered on a floor of the production line. The fixed or adhered position is located rearwardly of the vehicle (e.g., 1 meter rearwardly from the rear bumper) and is so arranged as to be substantially parallel to the vehicle width. The target bar TB is in the form of a wide plastic plate having dimensions of 200 cm×5 cm×0.2 cm. The thickness is not great and thus no problems arise when the plate is treated as two dimensional. This means that the target bar TB is not a 3D item or is not solid. Thus, the target bar TB does not interfere with an operator's work even when the target bar TB gets stepped on.

In relation to calibrating the CCD camera 17, with reference to FIG. 1, an explanation of perspective projection transformation is made which transforms the standard coordinate system (X, Y, Z) into a camera coordinate system (X', Y', Z') whose original point is the camera mounting point and image coordinate system (x, y) which represents an on-screen image picked up by the camera 17. The following formula [1] represents the corresponding relationship between the image coordinate system (image space) and the 3D coordinate system (3D space).

$$x = P_p \begin{bmatrix} X \\ 1 \end{bmatrix} \qquad [1]$$

x: homogeneous coordinate of image space

X: homogeneous coordinate of 3Dspace

Pp: camera projection matrix

The detailed version of this formula is as follows.

$$\begin{bmatrix} x \\ y \\ 1 \end{bmatrix} = \begin{bmatrix} P_{11} & P_{12} & P_{13} & P_{14} \\ P_{21} & P_{22} & P_{23} & P_{24} \\ P_{31} & P_{32} & P_{33} & P_{34} \end{bmatrix} \begin{bmatrix} X \\ Y \\ Z \\ 1 \end{bmatrix} \qquad [2]$$

Pp is a homogeneous matrix and therefore has the indefiniteness of a fixed multi number. Though the number of parameters (i.e., camera parameters in the present embodiment) is 12, the degree of freedom is 11.

Pp is also represented as the following formula [3]

Pp=C[R|T]

where C: in-camera parameters, comprises 5 parameters, f: focus length, kl: distortion coefficient of the camera lens, Sx: aspect ratio of magnification, (Cx, Cy): coordinate of the center of image

[R|T]: outer-camera parameter having the following six parameters.

In this case, T: transition component Tx, Ty, and Tz relative to X, Y, and Z axes of 3D coordinate and R: rotation component relative to each axis—θ x: tilt angle, θ y: pan angle, and θ z: roll angle.

At this stage, perspective projection transformation is explained. For example, after parallel movement is made by (Tx, Ty, Tz), a rotation through an angle of θ y (pan angle) about Y-axis, a rotation through an angle of θ x (tilt angle) about X-axis, and a rotation through an angle of θ z (roll angle) about Z-axis are made in such an order, components of each formation of transition and rotation are represented as follows.

$$[T] = \begin{bmatrix} 1 & 0 & 0 & Tx \\ 0 & 1 & 0 & Ty \\ 0 & 0 & 1 & Tz \\ 0 & 0 & 0 & 1 \end{bmatrix} \qquad [4]$$

-continued $$[Rx] = \begin{bmatrix} 1 & 0 & 0 & 0 \\ 0 & \cos\theta_x & -\sin\theta_x & 0 \\ 0 & \sin\theta_x & \cos\theta_x & 0 \\ 0 & 0 & 0 & 1 \end{bmatrix}$$ [5]

$$[Ry] = \begin{bmatrix} \cos\theta_y & 0 & \sin\theta_y & 0 \\ 0 & 1 & 0 & 0 \\ -\sin\theta_y & 0 & \cos\theta_y & 0 \\ 0 & 0 & 0 & 1 \end{bmatrix}$$

$$[Rz] = \begin{bmatrix} \cos\theta_z & -\sin\theta_z & 0 & 0 \\ \sin\theta_z & \cos\theta_z & 0 & 0 \\ 0 & 0 & 1 & 0 \\ 0 & 0 & 0 & 1 \end{bmatrix}$$

On the other hand, camera coordinate system (X', Y'.Z') relative to standard coordinate system (X, Y, Z) is represented as the following formulas.

$$\begin{bmatrix} X' \\ Y' \\ Z' \\ 1 \end{bmatrix} = [EXT] \begin{bmatrix} X \\ Y \\ Z \\ 1 \end{bmatrix}$$ [6]

$$[EXT] = [R_y]\cdot[R_x]\cdot[R_z]\cdot[T] = [R]\cdot[T]$$ [7]

Moreover, [R] and [EXT] are represented by the following formulas [8] and [9], respectively. [8][R]=

$$[R] = \begin{bmatrix} \cos\theta_y\cos\theta_z + \sin\theta_y\sin\theta_x\sin\theta_z & -\cos\theta_y\sin\theta_z + \sin\theta_y\sin\theta_x\cos\theta_z & \sin\theta_y\cos\theta_x & 0 \\ \cos\theta_x\sin\theta_z & \cos\theta_x\cos\theta_z & -\sin\theta_x & 0 \\ -\sin\theta_y\cos\theta_z + \cos\theta_y\sin\theta_x\sin\theta_z & \sin\theta_y\sin\theta_z + \cos\theta_y\sin\theta_x\cos\theta_z & \cos\theta_y\cos\theta_x & 0 \\ 0 & 0 & 0 & 1 \end{bmatrix}$$ [8]

$$= \begin{bmatrix} a & b & c & 0 \\ d & e & f & 0 \\ g & h & i & 0 \\ 0 & 0 & 0 & 1 \end{bmatrix}$$

$$[EXT] = [R_y]\cdot[R_x]\cdot[R_z]\cdot[T] = [R]\cdot[T]$$ [9]

$$= \begin{bmatrix} a & b & c & aT_x + bT_y + cT_z \\ d & e & f & dT_x + eT_y + fT_z \\ g & h & i & gT_x + hT_y + iT_z \end{bmatrix} = \begin{bmatrix} a & b & c & p \\ d & e & f & q \\ g & h & i & r \end{bmatrix}$$

Thus, this formula becomes the first matrix at the right side of the following formula [10].

$$\begin{bmatrix} x \\ y \\ 1 \end{bmatrix} = \begin{bmatrix} P_{11} & P_{12} & P_{13} & P_{14} \\ P_{21} & P_{22} & P_{23} & P_{24} \\ P_{31} & P_{32} & P_{33} & P_{34} \end{bmatrix} \begin{bmatrix} X \\ Y \\ Z \\ 1 \end{bmatrix}$$ [10]

Though the concrete calculating methods vary depending on the number of selected parameters from the parameters ($P_{11}$~$P_{34}$) which are used as unknown for the calibration, for the calibration when all twelve parameters are assumed to be unknown, the requirement is to solve simultaneous equations of 11 or more unknowns with respect to the formula [2].

However, in practice, some of the parameters are sometimes allowed to be treated as known amounts. Also, it is allowed to solve n-dimensional simultaneous equations with respect to the formula [2] assuming that the number of unknowns are n.

In fact, for calibrating the camera, the matrix is calculated from the known plural points on 3D space and dot group corresponding to each of the points. At this time, with respect to the plural sample points, 3D coordinates in the standard coordinate system and the camera coordinate system correspond to 2D coordinates in an image coordinate system and elements can be obtained by solving simultaneous equations. Hereinafter, the point on 3D space and 2D image will be said to be the 3D point and the image point.

The corresponding relationship between the 3D point and the image point is represented as follows.

$$x_1 = \frac{P_{11}X_i + P_{12}Y_i + P_{13}Z_i + P_{14}}{P_{31}X_i + P_{31}Y_i + P_{33}Z_i + P_{34}}$$ [11]

$$y_1 = \frac{P_{21}X_i + P_{22}Y_i + P_{23}Z_i + P_{24}}{P_{31}X_i + P_{31}Y_i + P_{33}Z_i + P_{34}}$$

whereby from one corresponding point two linear equations can be obtained. Thus, with respect to the freedom of P (=11): unknowns, solving simultaneous equations with respect to 6 or more corresponding points gives all parameters, thereby calibrating the CCD camera 17. Thus, the in-camera parameter C is known despite of the type of the CCD camera 17 and the translation component T becomes known from the mounting position of the CCD camera 17. So long as the roll angle θ r, the tilt angle θ t, and the pan angle θ p are known, calibrating the CD camera 17 becomes possible. That is to say, if two corresponding points are obtained from the formula [11] while finding the roll angle θ r, the tilt angle θ t, and the pan angle θ p, calibrating the unknown parameter becomes possible.

Consequently, a method or procedure for calibrating the CCD camera 17 mounted on the vehicle will be described hereinbelow. In the present embodiment, the opposite end points of the target bar TB are important factors.

The procedure is initiated after arranging the target bar TB at the rear side of the vehicle (i.e., 1 meter away from the rear bumper of the vehicle) in such a manner that the target bar TB is made perpendicular to a vehicular principal axis (i.e., a lengthwise axis passing through the center point of the vehicle) in symmetrical fashion.

Figure 5:
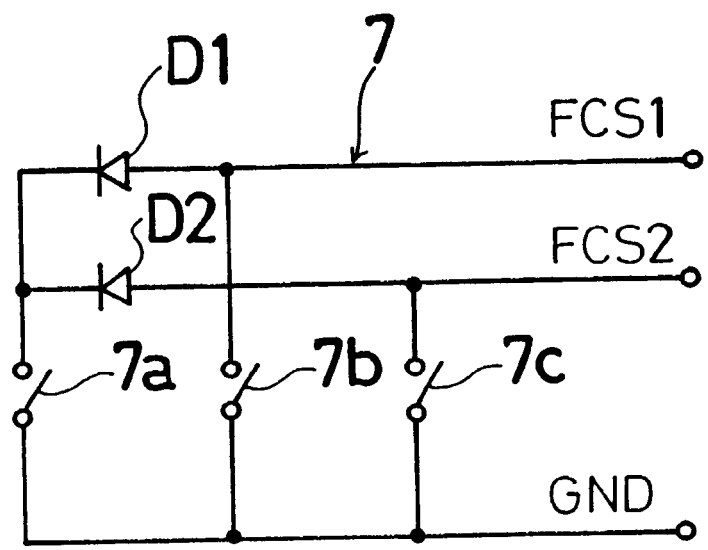
FIG. 5 illustrates a detailed structure of an adjust button illustrated in FIG. 1.

At this stage, the adjusting button 7 is connected to the signal input terminal of the CPU 11 by way of the connector 8. The adjusting button 7, as shown in FIG. 5, includes an A-button 7a, a B-button 7b, and a C-button 7c. One end of the A-button 7a is connected with respect to one end of the B-button 7b and one end of the C-button 7c by way of diodes D1 and D2, respectively. The other end of the A-button 7a, the other end of the B-button 7b and the other end of the C-button 7c are connected to a common ground terminal GND. One end of the B-button 7b and one end of the C-button 7c constitute a terminal FCS1 and a terminal FCS2, respectively, of the adjusting button 7 which are connected to the CPU 11. For example, if the A-button 7a is pushed or turned on, both of the terminals FCS1 and FCS2 become low potential (Lo), while if only the B-button 7b or C-button 7c is pushed or turned on, only the terminal FCS1 or terminal FCS2, respectively, becomes low potential. The wired-off condition of the A-button is not necessary.

If the A-button 7a is pushed, one of windows WDr, WDt, and WDp appears on the screen of the display 13 which are sometimes referred to as a window WD). The window WD has a regional area in which the full-size of the target bar TB falls and is superposed on the vehicular rear-view scene image on the screen. Changing the mode can be made by the A-switch 7a. That is, intermittent operation of the A-switch 7a for a time duration (e.g., 0.5 seconds), the condition passes through roll angle adjust mode, tilt angle adjust mode, pan angle adjust mode, and adjust termination mode in cyclic fashion. The B-button 7b and the C-button 7c are used to adjust the position of the window WD (WDr, WDt, Edp).

It is to be noted that as long as the tilt angle is <±5.5 degrees, the pan angle is <±5.5 degrees, and the roll angle is <±6.0 degrees, the full size of the target bar TB is set to fall in the window WI.

Figure 6A:
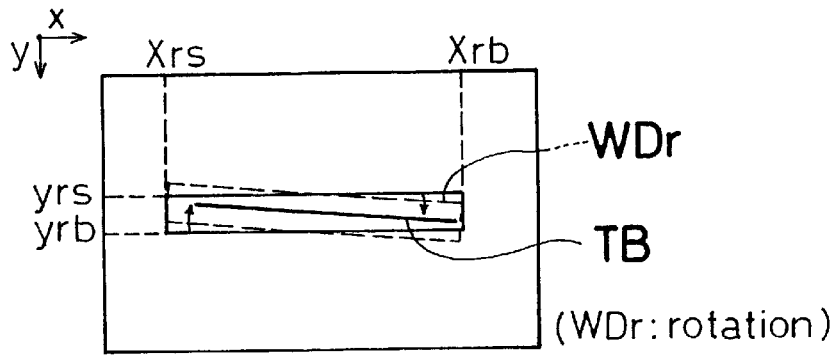
FIG. 6(a), FIG. 6(b), and FIG. 6(c) illustrate on-screen images of a roll angle adjust mode, tilt angle adjust mode, and pan angle adjust mode, respectively.

Now the adjustment is illustrated in table form. At first when the mode is the roll angle adjust mode, whenever the B-button 7b is pushed, the window WDr shown in FIG. 6(a) is rotated through an angle of 0.5 degree, for example, in the counterclockwise direction, about the center of the image, while whenever the C-button 7c is pushed, the window WDr is rotated through an angle of 0.5 degree, for example, in the clockwise direction about the center of the image. It is to be noted that the characteristics of the window WDr are: Indication color is yellow, the dimension of x-direction is (xrb-xrs) dots, and the dimension of y-direction is (yxrb-yrs) dots.

Here, the B-button 7b and/or the C-button 7c are manipulated such that whenever each of the buttons is pressed the roll angle set value is changed by 0.5 degrees until the window WDr at the roll angle adjust mode is brought parallel to the target bar TB. In this mode, the window WDr is slightly larger than the target bar TB in area.

Figure 6B:
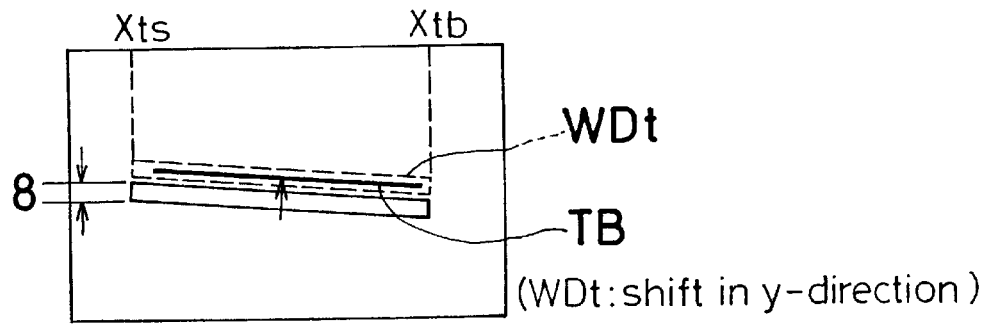

When the window WDr comes to be parallel to the target bar TB, the tilt angle adjust mode is established by pushing the A-button for a time duration of 0.5 seconds, for example, as shown in FIG. 6(b).

In this mode, the window WDt for the tilt angle adjustment is displayed on the screen in red. In this mode, though the dimension in the x-direction is the same as that of the window WDr in magnitude, the dimension in the y-direction, which is smaller than that of the window WDr, is represented as 8 bits so as to allow a tolerance of ±2 cm at the 1 meter backward position. In this mode, similar operations of the B-button 7b and the C-button 7c are made such that whenever each of the buttons is pressed the tilt angle set value is changed by 0.5 degrees until the upper/lower boundary is circumscribed on the target bar TB.

Figure 6C:
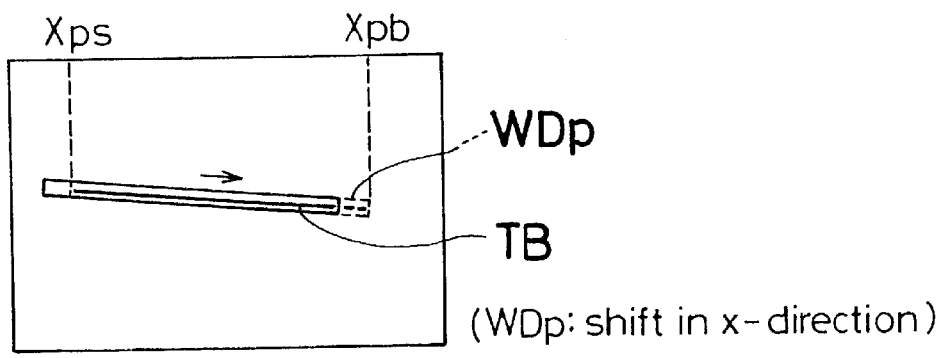

Thereafter, the A-button 7a is continued to be pressed for a time duration of 0.5 seconds, for example, the mode becomes the pan angle adjust mode, as shown in FIG. 6(c). In this mode, the x-direction dimension is (xpb-xrs) which is narrower than that of the window WDr and the y-direction dimension has a tolerance of ±3 cm at the 1 meter rearward position. In this mode, similar operations of the B-button 7b and the C-button 7c are made such that whenever each of the buttons is pressed the pan angle set value is changed by 0.5 degrees until the right/left boundary is circumscribed on the target bar TB.

When the target bar TB becomes in coincidence with the window WDp as a result of thus performed adjustments of roll, tilt, and pan, if the A-button 7a is pressed in continual fashion for a time duration of 0.5 seconds, for example, the adjust mode terminates and an angle is determined based on the window condition at this time. In this case, angle information obtained from each of three adjust modes are stored as camera parameters of the CCD camera 17 into EEROM inside the CPU 11. Then the adjust mode terminates.

Upon termination of adjustment which is thus performed, on the basis the camera parameters adjusted by the foregoing adjustment procedure, the forecasted vehicle travel path 20 appears on the screen of the display 13.

Figure 8:
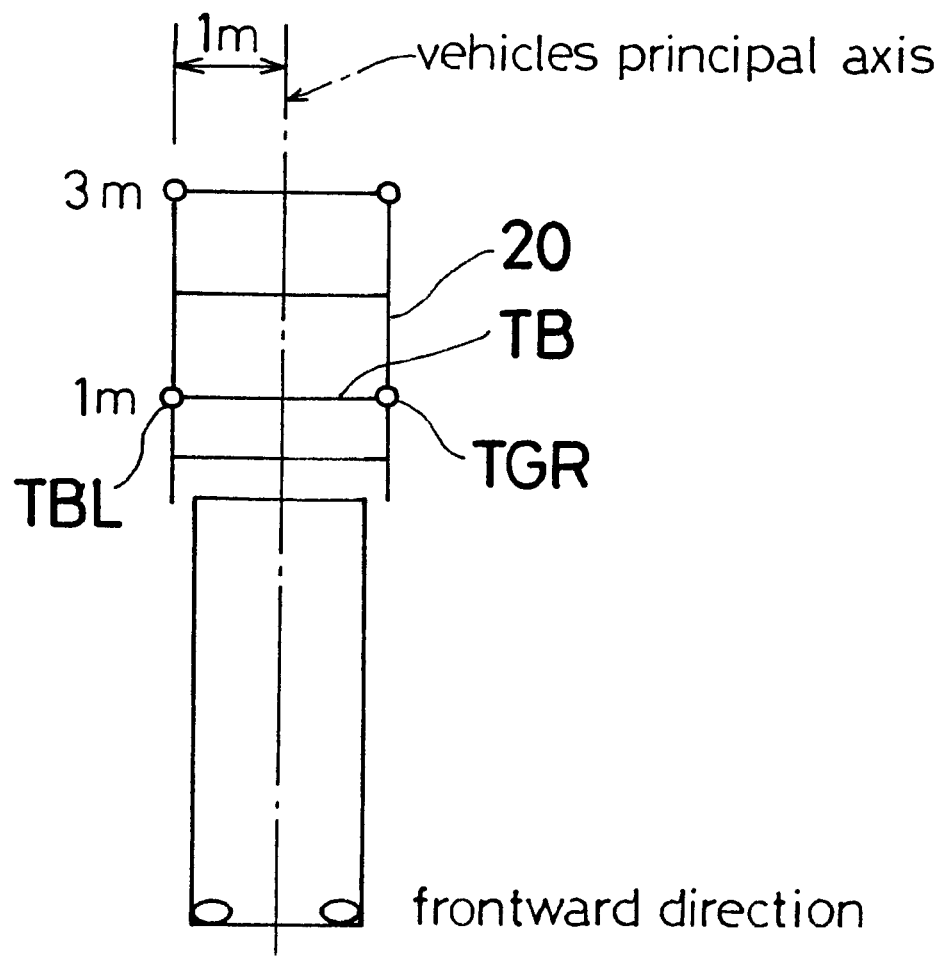
FIG. 8 illustrates an example wherein a target bar is incorporated in a forecast vehicular travel path.

In this case, as shown in FIG. 8, the forecast vehicle travel path 20 is desired to be in the form of a ladder such that the horizontal lines represent the positions of 0.5 m, 1 m, 2 m, and 3 m away from the rear side of the vehicle. For example, from one of the horizontal lines of the path 20, such as the line which is 1 meter away from the rear side of the vehicle and which has opposite end points TBR and TBL, the camera parameters can be obtained, which results in an immediate confirmation of whether or not the setting of the camera parameters is correct. On the other hand, when the target bar TB is fixed in a fixed position rearwardly of the vehicle, if the forecast vehicle travel path 20 is displayed after setting the camera parameters, whether or not the camera parameters obtained by the calibration are correct can be confirmed easily by the horizontal line (which is 1 meter away from the rear side of the vehicle).

Setting camera parameters in such a way makes the forecast vehicle travel path 20 which is displayed on the display 13 when parking the vehicle free from the tolerance of the CCD camera 17 per se and/or the tolerance which is generated when the CCD camera 17 is mounted on the vehicle.

The invention has thus been shown and described with reference to specific embodiments, however, it should be understood that the invention is in no way limited to the details of the illustrated structures but changes and modifications may be made without departing from the scope of the appended claims.

What is claimed is:

1. A camera calibration device for calibrating an on-vehicle camera based on an object placed in an image picked up by the on-vehicle camera comprising:

a planar calibration indicator as the object;

displaying means for displaying the image including the planer calibration indicator;

window displaying means for displaying a window on the displaying means;

adjusting means for adjusting a position of the window displaying means within a coordinate of the image picked up by the on-vehicle camera; and parameter setting means for setting camera parameters such that when the calibration indicator is within the window as a result of the adjusting by the adjusting means, the resultant camera parameters are employed as the camera parameters.

2. A camera calibration method as set forth in claim 1, wherein said parameter setting means sets camera parameters such that when at least two points of the calibration indicator are within the window as a result of the adjusting by the adjusting means, the resultant camera parameters are employed as the camera parameters.

3. A camera calibration method as set forth in claim 2, wherein said each of the two points is an end of the planar calibration indicator.

4. A camera calibration method of calibrating an on-vehicle camera based on an object placed in an image picked up by the on-vehicle camera comprising the steps of;

preparing a planar calibration indicator as the object, displaying means for displaying the image including the planer calibration indicator, window displaying means for displaying a window on the displaying means, and adjusting means for adjusting a position of the window displaying means within a coordinate of the image picked up by the on-vehicle camera;

displaying the planar calibration indicator on the displaying means;

adjusting a related position of the window so as to include the planar calibration indicator therein; and setting camera parameters when the planar calibration indicator is located in the window.

5. A camera calibration method as set forth in claim 4, wherein the adjustment of the position relation of the window is made such that the window is rotated or shifted relative to the planar calibration indicator.

6. A camera calibration method as set forth in claim 4, wherein said setting camera parameters is when at least two points of the planar calibration indicator are located on the window.

7. A camera calibration method as set forth in claim 6, wherein said each of the two points is an end of the planar calibration indicator.

8. A calibration indicator displayed as a movable image related to vehicular travel on an on-vehicle displaying device in a superposed manner on a picked up scene image of the outside of the vehicle and is displayed and used a part of the movable images as an indicator when camera parameters are set.

9. A calibration indicator as set forth in claim 8, wherein the movable image is a forecast vehicle travel path which varies with a steering angle.

* * * * *